Figure 1:
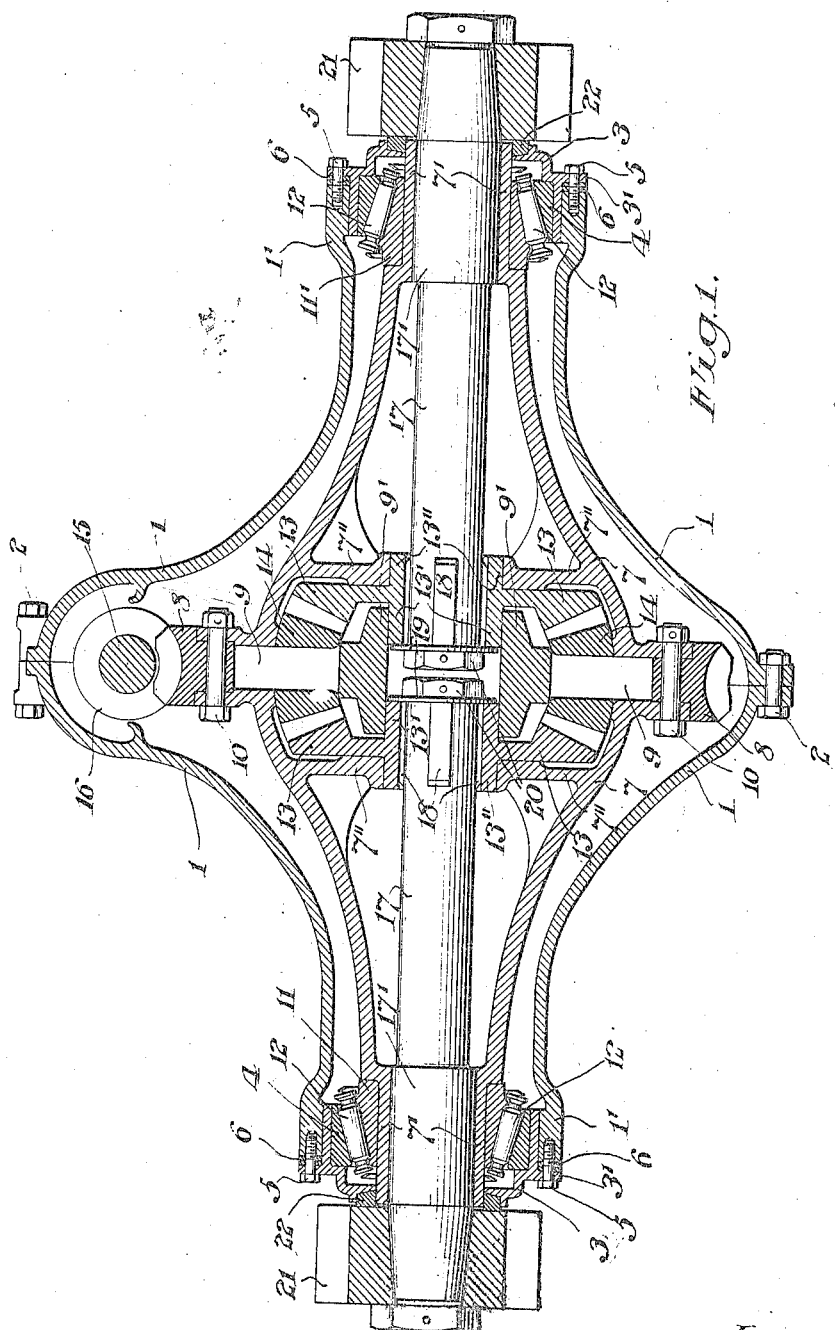

T. V. BUCKWALTER.
BEARING.
APPLICATION FILED OCT. 26, 1917.

1,264,890.

Patented May 7, 1918.
2 SHEETS—SHEET 1.

Inventor:
Tracy V. Buckwalter,
By Chas. N. Butler
Attorney

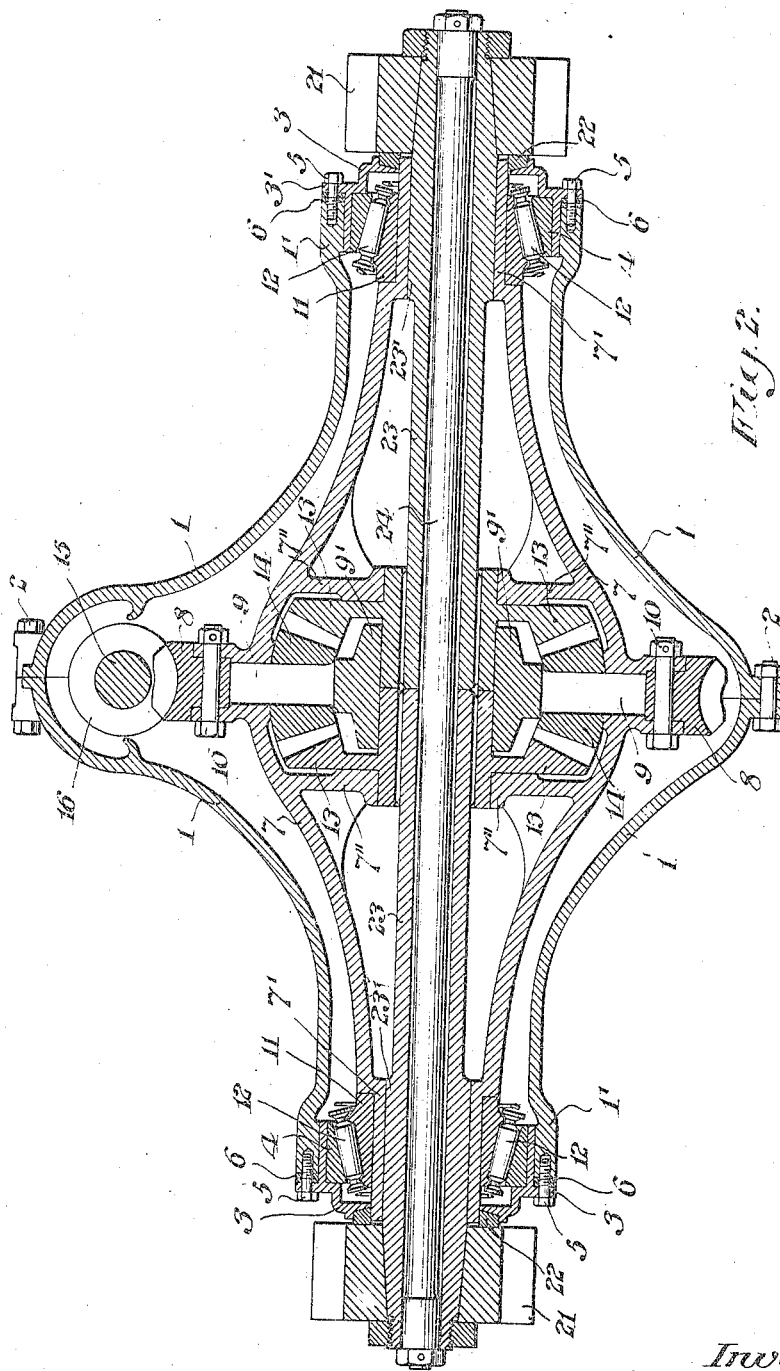

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

BEARING.

1,264,890.　　　　Specification of Letters Patent.　　Patented May 7, 1918.

Application filed October 26, 1917.　Serial No. 198,727.

*To all whom it may concern:*

Be it known that I, TRACY V. BUCKWALTER, a citizen of the United States, residing in the city of Canton, county of Stark, and State of Ohio, have invented certain Improvements in Bearings, of which the following is a specification.

My invention is designed primarily to provide improved jack shaft bearing mechanism for use in motor vehicles, and it comprises, in its preferred form, the combination with alined jack shafts and differential driving gears connected with their adjacent ends, of a differential housing provided with extended ends having external bearings at the opposite ends for carrying it and internal bearings for carrying the jack shafts, a housing inclosing the driving gears, together with the differential housing, and having internal end bearings concentric with the external bearings of the differential housing, and anti-friction bearings between such external and internal bearings second named whereby the differential housing is carried directly by the external housing.

A leading object of my invention is to provide a construction of superior stability, durability, convenience and efficiency, adapted for ready assembly, dissociation and adjustment.

In the accompanying drawings, Figure 1 is a longitudinal sectional view of a construction embodying my improvements; and Fig. 2 is a similar view of a construction embodying an alternate form of the invention.

The invention, as illustrated, comprises an exterior housing consisting of the similar sections 1 fixed together on a central plane by bolts 2 and having end hubs 1' which hold carriers 3 for cup bearings 4; the carriers being adjustable to adjust the cups axially by means of the bolts 5, which pass through the flanges 3' of the carriers, and the thin shims 6, of the desired character, placed between the flanges and the ends of the hubs.

A housing, interior to the housing described, consists of the similar sections 7 fixed together through the gear 8, which is disposed centrally with respect thereto and to the plane of juncture of the housing sections 1, the sections 7 being clamped to the gear and on the ends of oppositely extending spindles 9 fixed on the hub 9' by bolts 10. The extended ends 7' of the sections 7 have cone bearings 11 fixed thereon concentrically with the cone cups 4.

Rollers 12 are placed between the bearings 4 and 11, whereby the housing 7—7 is carried directly through these anti-friction bearings by the housing 1—1.

Bearings 7'', fixed symmetrically within the housing 7—7, coact with the hub or bearing 9' to journal the bevel-gears 13, which are provided respectively with the oppositely extending cylindrical flanges or journals 13' and 13'', journaled in the respective bearings 9' and 7''.

Beveled pinions 14 are journaled on the spindles 9 and engage the beveled gears 13.

The revoluble driving shaft 15 has the worm 16 thereon, within the housing 1—1, which engages the worm gear 8, and thereby revolves the housing 7—7, together with the parts 9, 9' and 14, about the housing axis, the gears 13 being operated thereby in the well known manner.

As illustrated in Fig. 1, jack shafts 17 have their adjacent inner ends fixed to the wheels 13 by keys 18, rings 19 and nuts 20, and their outer ends, provided with the enlarged journals 17', journaled in the end bearings 7', which are drawn in from the body of the housing to provide the desired character of bearings for the jack shafts, as well as seats for the cones 11.

Driving wheels 21, which may be pinions or sprockets, are fixed on the outer ends of the jack shafts, adjacent to the housing ends 7' and the carriers 3, the latter being provided with the packing rings 22 surrounding the parts 7' adjacent to the wheels 21.

As illustrated in Fig. 2, hollow jack shafts 23 have their abutting inner ends keyed to the respective wheels 13, and are held together by the rod 24 which extends therethrough, the shafts having the enlarged journals 23' (which are carried in the bearings 7') and the wheels 21 fixed thereon for transmitting the power.

Having described my invention, I claim:

1. The combination with an outer housing having bearing means at the opposite ends thereof, an inner housing having bearing means at the opposite ends thereof coacting with said bearing means first named whereby said inner housing is revoluble in said outer housing, independently revoluble alined shafts journaled in said inner housing, differential mechanism carried by said inner housing for driving said shafts, and wheels fixed on the outer ends of said shafts.

2. The combination with a housing having extended ends each provided with an inner and an outer bearing, jack shafts having their outer ends journaled in the respective inner bearings, means within said housing for supporting the adjacent inner ends of and revolving said jack shafts, mechanism exterior to said housing for supporting it revolubly through its said outer bearings, and mechanism for revolving said housing.

3. The combination of a pair of alined jack shafts, differential driving mechanisms connected with the adjacent inner ends thereof, a differential housing within which said mechanisms are journaled, said housing having oppositely extended ends each provided with an inner bearing having an outer end of one of said jack shafts journaled therein and an outer bearing for supporting said housing revolubly, an outer housing having end hubs provided with inner bearings concentric with said outer bearings, antifriction devices disposed between said concentric bearings, and means within said outer housing for revolving said inner housing.

4. The combination of a pair of alined jack shafts, wheels fixed on the opposite end of each shaft, a housing having internal bearings within which both ends of both shafts are journaled respectively, means within said housing for effecting a differential operation of the wheels on the adjacent ends of said shafts, a second housing, and means within said second housing whereby said housing first named is supported revolubly.

5. The combination of a differential housing having ends provided with inner and outer bearings, jack shafts journaled in said inner bearings, an outer housing provided with adjustable bearing carriers and bearings concentric with said outer bearings, and anti-friction devices disposed between the outer bearings and the bearings of said outer housing.

6. The combination of an outer housing, devices connected adjustably to the ends of said housing, bearings supported adjustably by said devices, an inner housing, bearings fixed on the ends of said inner housing within said device concentrically with said bearings first named, and anti-friction devices between said concentric bearings.

7. The combination of an outer housing having end hubs, carrying means and bearing cups supported thereby within said hubs, said means having flanges for connecting them adjustably with relation to said hubs, a differential housing having extended ends and bearing cones fixed thereon concentrically with relation to said cups, and conical rollers between said cups and cones, said means inclosing said cones and rollers.

8. The combination of a pair of alined shafts, a rod extending through said shafts whereby they are tied together, differential mechanism connected with said shafts for revolving them, a revoluble housing in which said shafts and mechanism revolve, and means exterior to said housing whereby it is journaled.

In testimony whereof I have hereunto set my name this 22nd day of October, 1917.

TRACEY V. BUCKWALTER.